United States Patent
Lee et al.

(10) Patent No.: US 8,249,300 B2
(45) Date of Patent: Aug. 21, 2012

(54) IMAGE CAPTURING DEVICE AND METHOD WITH OBJECT TRACKING

(75) Inventors: Hou-Hsien Lee, Taipei Hsien (TW);
Chang-Jung Lee, Taipei-Hsien (TW);
Chih-Ping Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 173 days.

(21) Appl. No.: 12/841,983

(22) Filed: Jul. 22, 2010

(65) Prior Publication Data
US 2011/0255739 A1  Oct. 20, 2011

(30) Foreign Application Priority Data
Apr. 16, 2010  (CN) .......................... 2010 1 0148842

(51) Int. Cl.
*G06K 9/00*  (2006.01)
*H04N 7/18*  (2006.01)

(52) U.S. Cl. .......................... 382/103; 382/291; 348/153

(58) Field of Classification Search ............... 382/103, 382/100, 106–107, 168, 181, 209, 232, 274, 382/276, 291, 305, 312; 348/157, 153; 340/572.1, 340/572.4; 700/115
See application file for complete search history.

(56) References Cited

U.S. PATENT DOCUMENTS

| | | | | |
|---|---|---|---|---|
| 6,941,184 | B2 * | 9/2005 | Ebert | ............................. 700/115 |
| 7,522,186 | B2 * | 4/2009 | Arpa et al. | ..................... 348/153 |
| 7,667,604 | B2 * | 2/2010 | Ebert et al. | ................. 340/572.4 |
| 7,969,306 | B2 * | 6/2011 | Ebert et al. | ................. 340/572.1 |
| 2009/0059007 | A1 * | 3/2009 | Wagg et al. | ..................... 348/157 |

* cited by examiner

*Primary Examiner* — Seyed Azarian
(74) *Attorney, Agent, or Firm* — Altis Law Group, Inc.

(57) ABSTRACT

A method for dynamically tracking a specific object in a monitored area obtains an image of the monitored area by one of a plurality of image capturing devices in the monitored area, and detects the specific object in the obtained image. The method further determines adjacent image capturing devices in the monitored area according to the path table upon the condition that the specific object is detected, and adjusts a detection sensitivity of each of the adjacent image capturing devices.

17 Claims, 9 Drawing Sheets

| Camera ID | Next Camera ID |
|---|---|
| 50 | 51, 53 |
| 51 | 50, 52, 55 |
| 52 | 51, 56 |
| 53 | 50, 54, 58 |
| 54 | 53, 58 |
| 55 | 51, 56, 57 |
| 56 | 52, 55, 60 |
| 57 | 55, 56, 59 |
| 58 | 53, 54, 59 |
| 59 | 57, 58, 60 |
| 60 | 56, 59 |

FIG. 4

IMAGE CAPTURING DEVICE AND METHOD WITH OBJECT TRACKING

BACKGROUND

1. Technical Field

Embodiments of the present disclosure relate to security surveillance technology, and particularly to an image capturing device and method for dynamically tracking a specific object in a monitored area.

2. Description of Related Art

Currently, image capturing devices have been used to perform security surveillance by sending captured images of monitored areas to a monitoring computer. However, the current image capturing device cannot dynamically track a specific object in the monitored area according to movements of the specific object in the monitored area.

BRIEF DESCRIPTION OF THE DRAWINGS

FIG. 4 is an example of a path table set based on the electronic map of FIG. 3.

DETAILED DESCRIPTION

All of the processes described below may be embodied in, and fully automated through functional code modules executed by one or more general purpose computers or processors. The code modules may be stored in any type of non-transitory readable medium or other storage system. Some or all of the methods may alternatively be embodied in specialized hardware. Depending on the embodiment, the non-transitory readable medium may be a hard disk drive, a compact disc, a digital video disc, a tape drive or other similar device.

Figure 1:
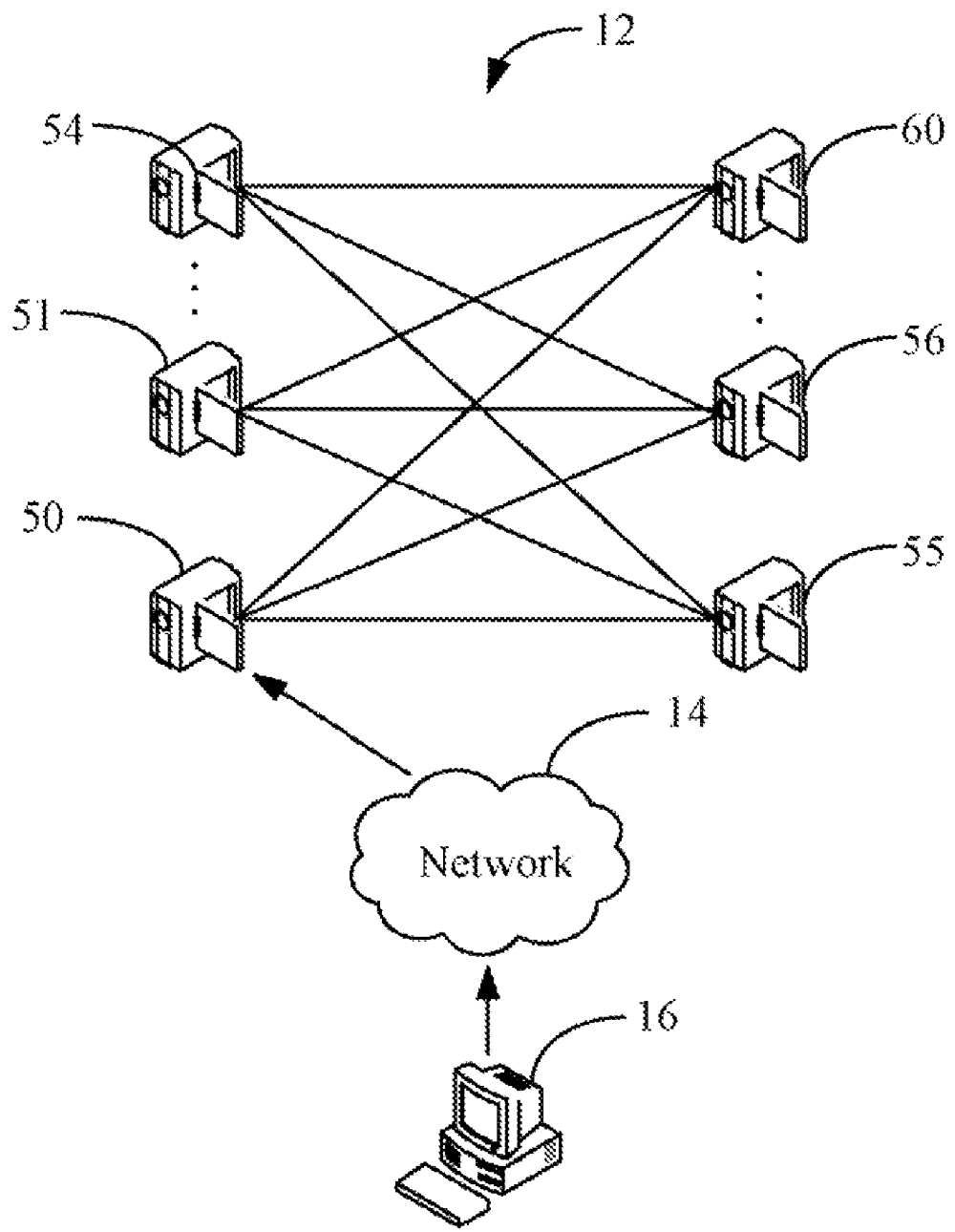
FIG. 1 is a schematic diagram of one embodiment of a monitor system.

FIG. 1 is a schematic diagram of one embodiment of a monitor system 12. In some embodiments, the monitor system 12 includes image capturing devices (e.g., 50-60), a network 14, and a computer 16. The monitor system 12 may dynamically track a specific object in a monitored area. Detailed descriptions are described in the following paragraphs. In some embodiments, the network 14 may be an intranet, the Internet, or other suitable communication network.

The image capturing devices 50-60 located in the monitored area electronically connect to each other by the network 14. An administrator may log onto one of the image capturing devices (e.g., image capturing device 50) to set at least one monitor parameters. The image capturing device 50 sends the set monitor parameters to the other image capturing devices (e.g., image capturing devices 51-60) through the network 14.

In some embodiments, the image capturing device may be a speed dome camera or pan-tilt-zoom (PTZ) camera, for example.

Figure 2:
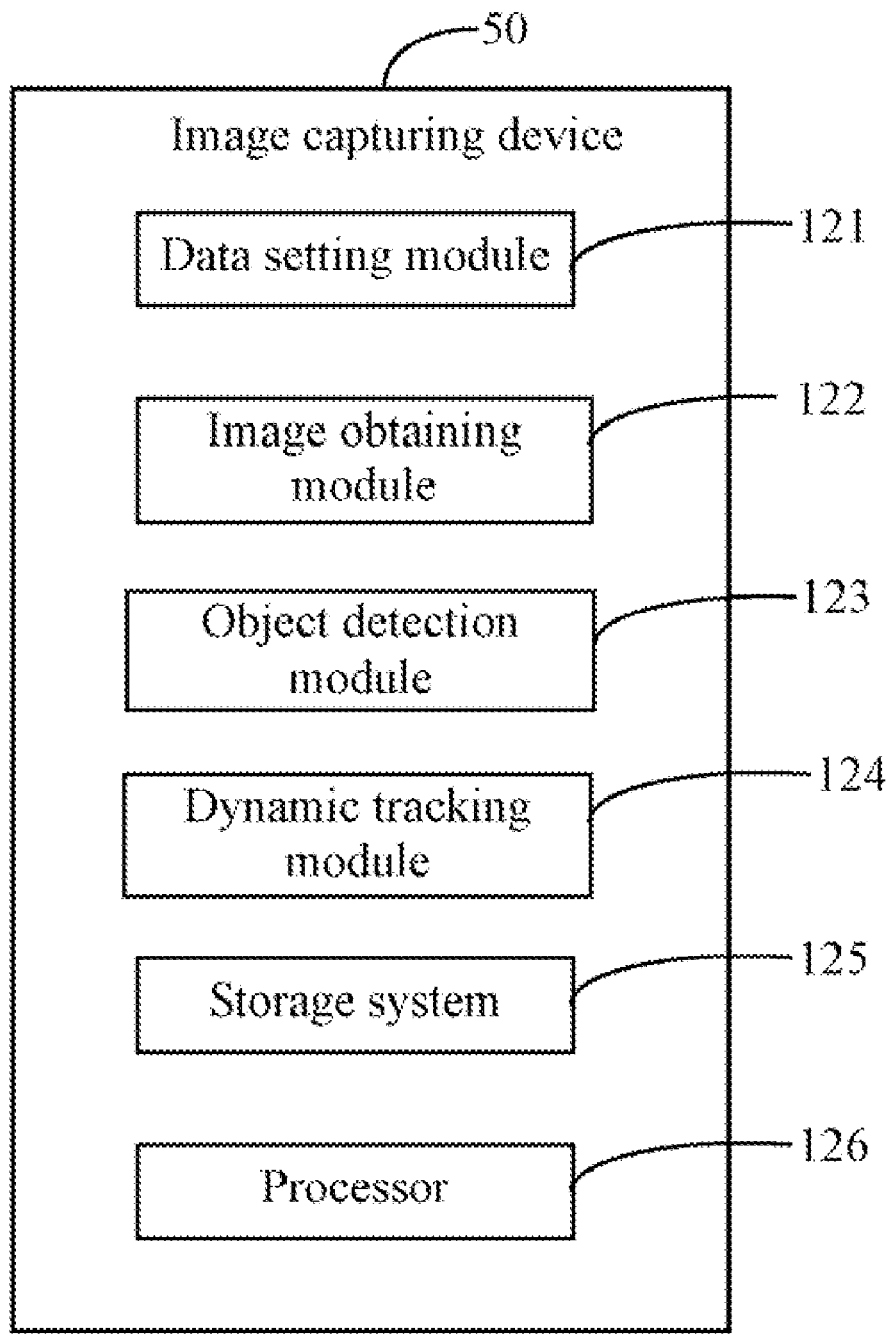
FIG. 2 is a block diagram of one embodiment of an image capturing device in the monitor system of FIG. 1.

FIG. 2 is a block diagram of one embodiment of the image capturing device 50 in the monitor system 12 of FIG. 1. In some embodiments, the image capturing device 50 includes a data setting module 121, an image obtaining module 122, an object detection module 123, a dynamic tracking module 124, a storage system 125, and a processor 126. In some embodiments, the modules 121-124 comprise one or more computerized instructions that are stored in the storage system 125. The processor 126 executes the computerized instructions to implement one or more operations of the image capturing device 50. The image capturing device 50 is selected as an exemplary device. It is understood that the other image capturing devices (e.g., image capturing devices 51-60) may have the same function modules as the image capturing device 50.

The data setting module 121 sets a path table 30, a tracking mechanism, and tracking parameters of the image capturing device 50. As shown in FIG. 4, the path table 30 includes a first column indicative of an identifier (ID) of each of the image capturing devices in the monitored area, and a second column indicative of the identifiers of adjacent image capturing devices of each of the image capturing devices. For example, in FIG. 4, the adjacent image capturing devices of the image capturing device 50 are the image capturing devices 51 and 53.

The tracking mechanism may be used to detect human faces or other objects. In some embodiments, the tracking parameters includes a time interval to perform data synchronization between the image capturing devices, and contact information of the administrator. The contact information of the administrator may include a telephone number and/or an E-mail address of the administrator. The time interval may be set according to user requirements, such as five minutes.

The image obtaining module 122 obtains an image of the monitored area. In some embodiments, the image obtaining module 122 may obtain the image of the monitored area using a charge coupled device (CCD) of the image capturing device 50.

The object detection module 123 detects a specific object 20 (referring to FIG. 5) in the obtained image using the tracking mechanism. For example, the specific object 20 may be a human face. If the specific object 20 is the human face, the object detection module 123 detects the human face using a skin color model in YCbCr space or a face template matching method.

Figure 5:
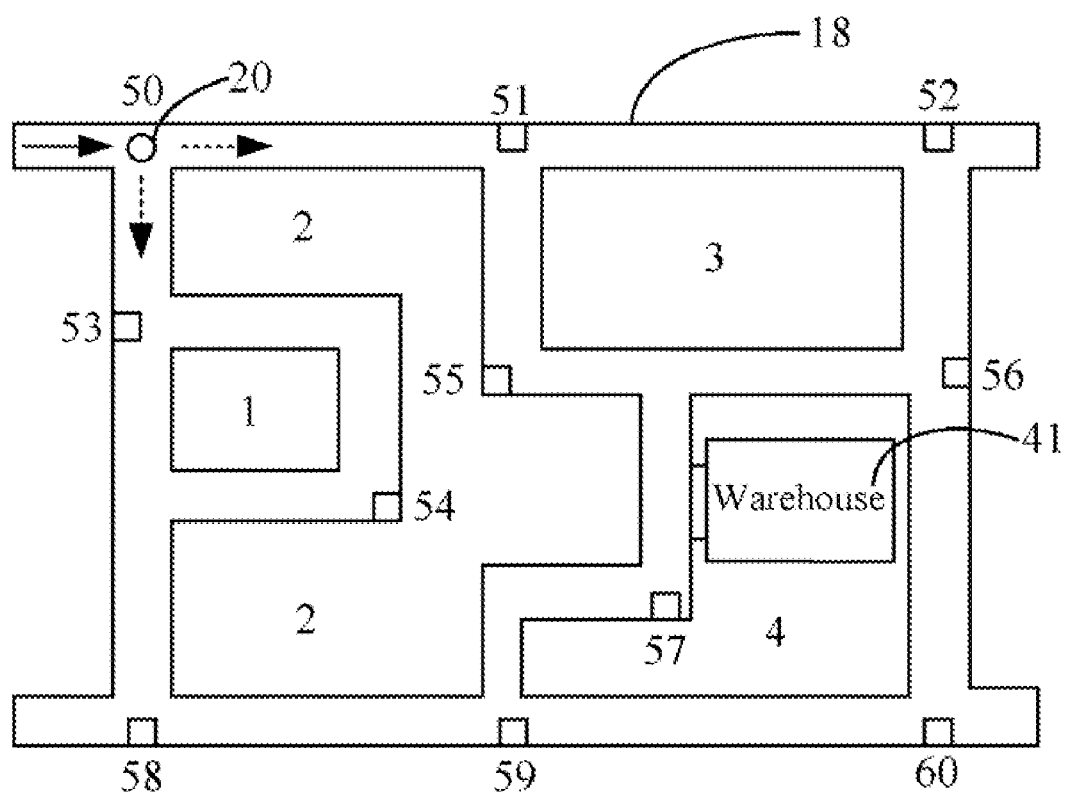
FIGS. 5-7 are schematic diagrams of one embodiment of performing a dynamically tracking method using the path table of FIG. 4.

Upon the condition that the specific object 20 is detected, the dynamic tracking module 124 obtains the path table 30 from the storage system 125 of the image capturing device 50. The dynamic tracking module 124 queries the path table 30 to determine the adjacent image capturing devices in the monitored area. As shown in FIG. 5, if the specific object 20 is detected by the image capturing device 50, the image capturing devices 51 and 53 are determined to be the adjacent image capturing devices according to the path table 30. That is to say, the image capturing devices 51 and 53 may detect the specific object 20 as the specific object 20 moves from one area to another area.

The dynamic tracking module 124 adjusts a detection sensitivity of each of the adjacent image capturing devices according to a sensitivity mode of the image capturing device upon the condition that the adjacent image capturing devices are determined. In some embodiments, the sensitivity mode of each of the adjacent image capturing devices may be adjusted from a low sensitivity mode to a high sensitivity mode. For example, under the low sensitivity mode, the image capturing device would ignore the specified object 20, and determine that the specified object 20 is not detected if an area of the specified object 20 is less than 5×5. Under the high sensitivity mode, the image capturing device determines that the specified object 20 is not detected if an area of the specified object 20 is less than 2×2.

In addition, the dynamic tracking module 124 may record a movement path of the specific object 20, and store the movement path of the specific object 20 in the storage system 125 of the image capturing device 50. In some embodiments, the movement path of the specific object 20 may be recorded with a solid arrow connected by each image capturing device which detects the specific object 20 (refer to FIGS. 5-7). Upon the condition that the specific object 20 is detected, the dynamic tracking module 124 may send a warning message to the administrator through the SMS message and/or an E-mail. In other embodiments, the dynamic tracking module 124 may adjust a monitoring direction of each of the adjacent image capturing devices to pan, tilt and zoom each of the adjacent image capturing devices on the specific object 20.

Figure 6:
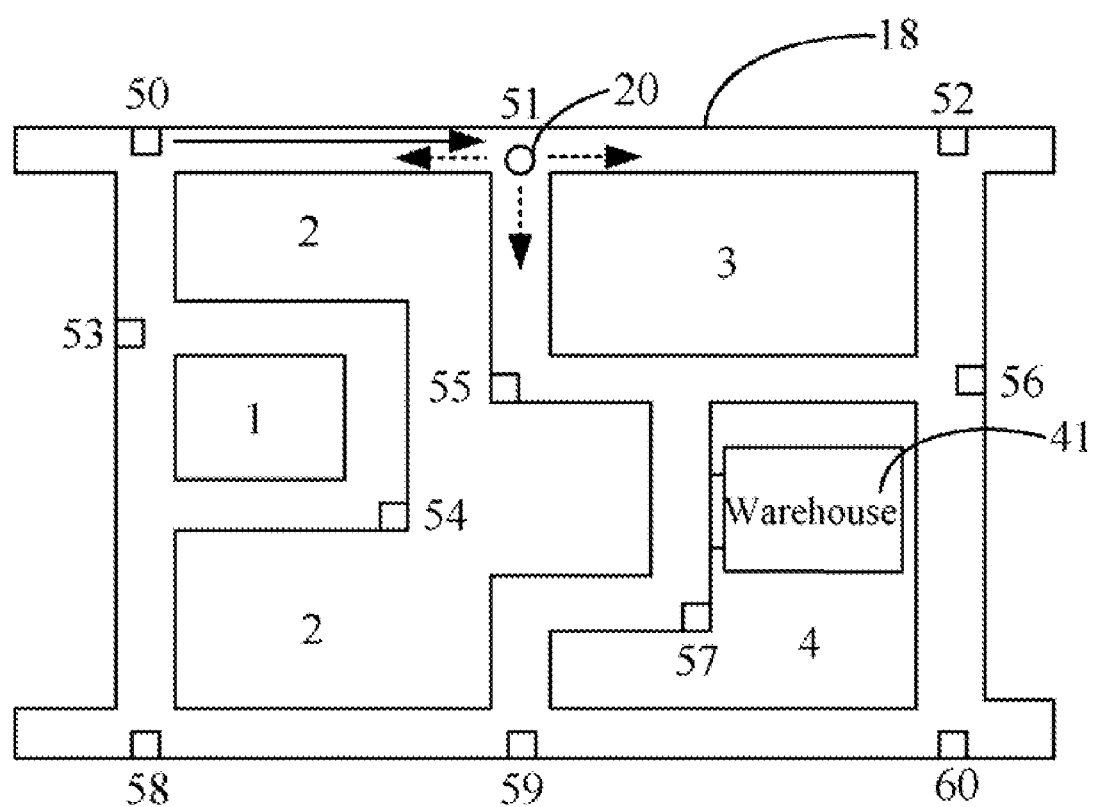
Figure 7:
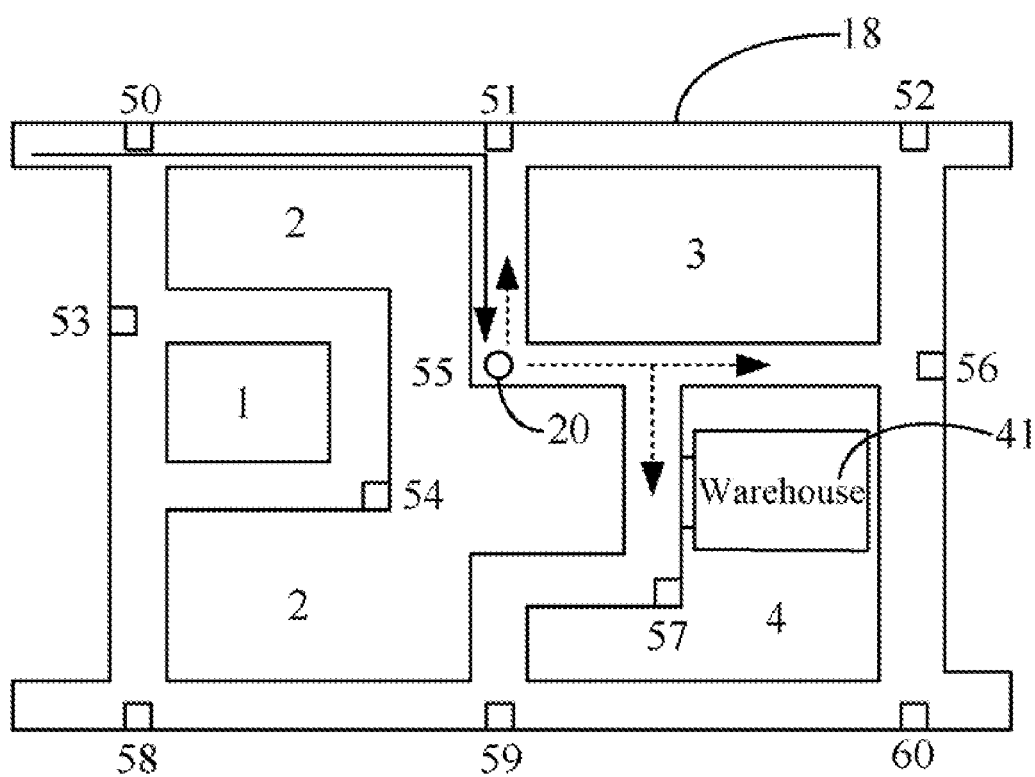

As shown in FIG. 6, the specific object 20 moves from a position of the image capturing device 50 to a position of the image capturing device 51, the image capturing devices adjacent to the image capturing device 51 in the path table 30 are the image capturing devices 50, 52, and 55. In some embodiments, the dynamic tracking module 124 may adjust the detection sensitivity of each of the image capturing devices of 50, 52, and 55. In FIGS. 5-7, the solid arrow represents the movement path of the specific object 20, and dashed arrows represent predicted movement directions of the specific object 20.

As shown in FIG. 7, the specific object 20 moves from a position of the image capturing device 51 to a position of the image capturing device 55, the image capturing devices adjacent to the image capturing device 55 in the path table 30 are the image capturing devices 51, 56, and 57. In some embodiments, the dynamic tracking module 124 may adjust the detection sensitivity of each of the image capturing devices of 51, 56, and 57. As the image capturing device 57 is adjacent to the warehouse 41, the dynamic tracking module 124 may send a warning message to the administrator through the SMS message or an E-mail.

Figure 8:
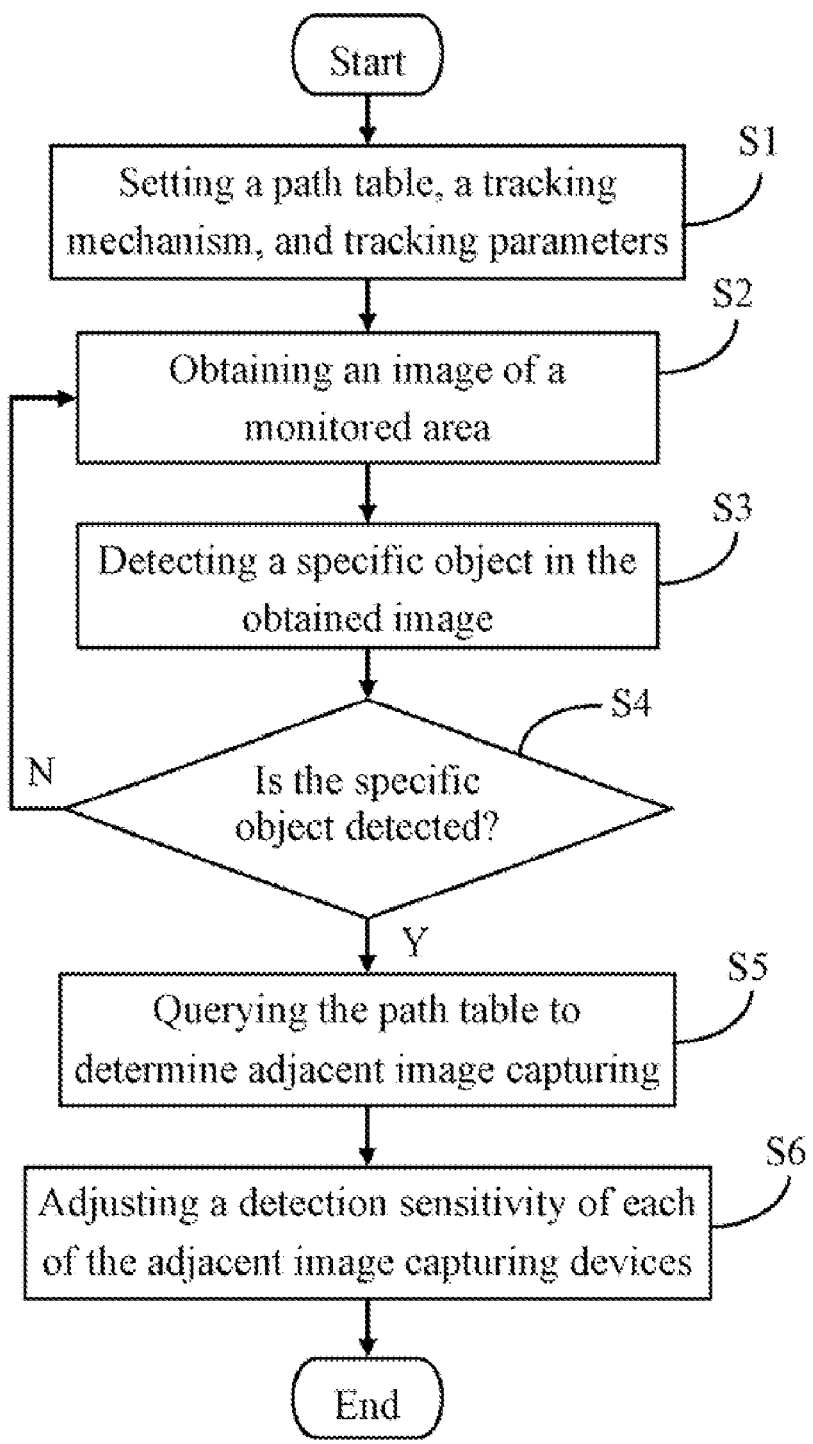
FIG. 8 is a flowchart of one embodiment of a method for dynamically tracking of a specific object in a monitored area.

FIG. 8 is a flowchart of one embodiment of a method for dynamically tracking of a specific object in a monitored area. Depending on the embodiment, additional blocks may be added, others removed, and the ordering of the blocks may be changed.

In block S1, the data setting module 121 sets a path table 30, a tracking mechanism, and the tracking parameters of the image capturing device A.

In block S2, the image obtaining module 122 obtains an image of the monitored area.

In block S3, the object detection module 123 detects a specific object 20 (referring to FIG. 5) in the obtained image using the tracking mechanism. For example, the specific object 20 may be a human face.

In block S4, the object detection module 123 determines if the specific object 20 is detected. If the specific object 20 is detected, the procedure goes to block S5. If the specific object 20 is not detected, the procedure returns to block S2.

In block S5, the dynamic tracking module 124 obtains the path table 30 from the storage system 125 of the image capturing device 50, and queries the path table 30 to determine the adjacent image capturing devices in the monitored area.

In block S6, the dynamic tracking module 124 adjusts a detection sensitivity of each of the adjacent image capturing devices according to a sensitivity mode of the image capturing device upon the condition that the adjacent image capturing devices are determined.

In other embodiments, the method may further include the steps of recording a movement path of the specific object 20, sending a warning message to the administrator upon the condition that the specific object 20 is detected, and adjusting a monitoring direction of each of the adjacent image capturing devices to pan, tilt and zoom each of the adjacent image capturing devices on the specific object 20.

Figure 9:
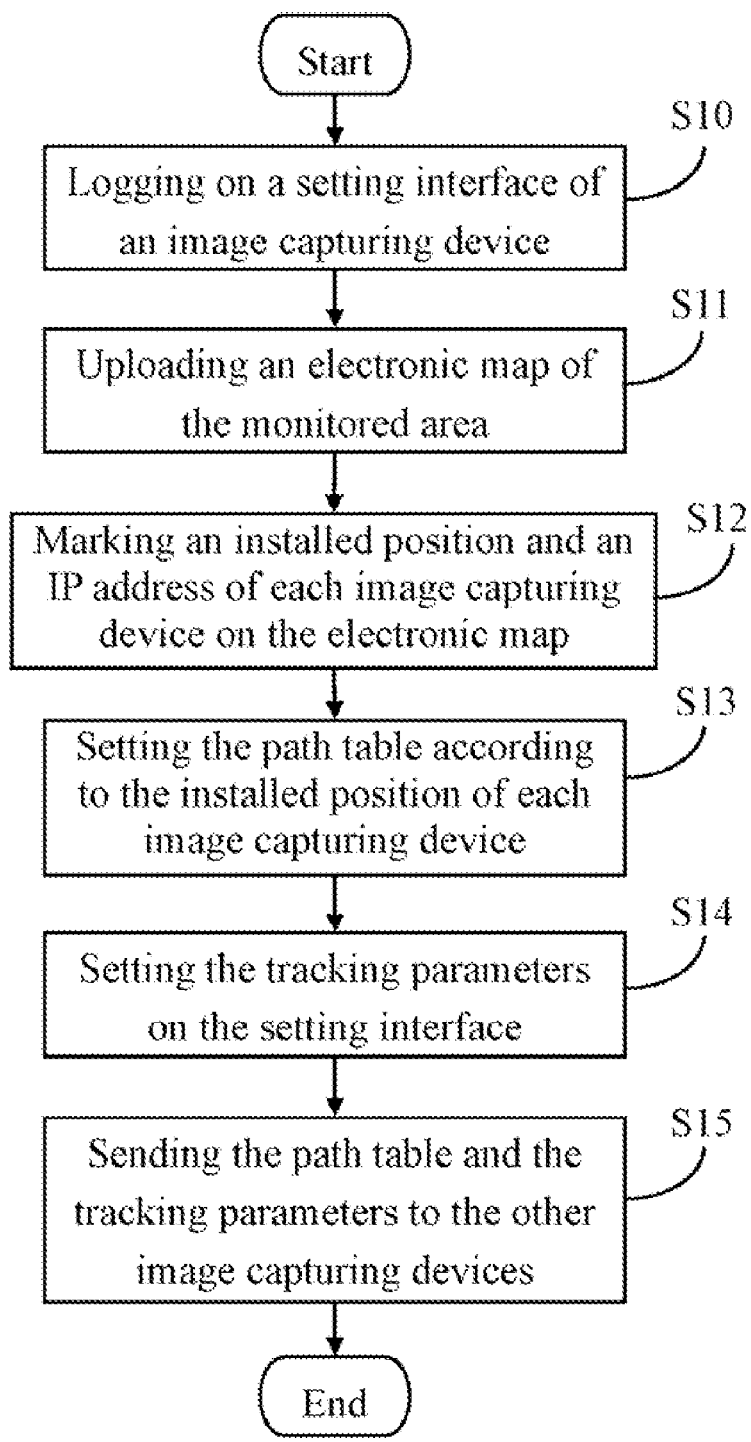
FIG. 9 is a detailed description of block S1 of the flowchart of FIG. 8 of setting a path table, a tracking mechanism, and tracking parameters.

FIG. 9 is a detailed description of block S1 of the flowchart of FIG. 8 of setting a path table, a tracking mechanism, and tracking parameters. Depending on the embodiment, additional blocks may be added, others removed, and the ordering of the blocks may be changed.

In block S10, an administrator logs on a setting interface of one of the image capturing devices (e.g., the image capturing device 50) in the monitored area by the computer 16 through the network 14.

Figure 3:
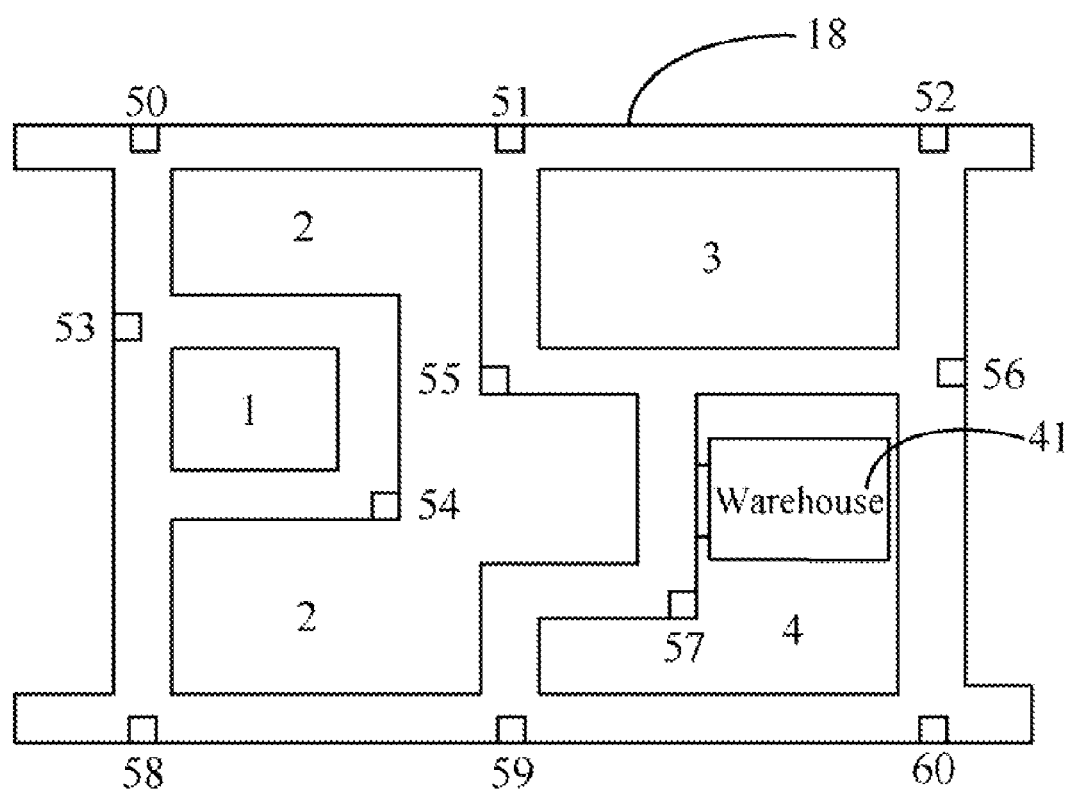
FIG. 3 is an example of an electronic map of a monitored area.

In block S11, an electronic map of the monitored area is uploaded from the computer 16 to the image capturing device 50 through the setting interface, and the data setting module 121 stores the electronic map in the storage system 125 of the image capturing device 50. As shown in FIG. 3, the electronic map 18 of the monitored area includes a warehouse 41 to be monitored. In the electronic map 18, area 1, area 2, area 3, and area 4 represent different rooms, and the warehouse 41 is positioned in area 4.

In block S12, the administrator marks an installed position and an Internet protocol (IP) address of each of the image capturing devices in the monitored area on the electronic map 18. The data setting module 121 stores the installed position and the IP address of each of the image capturing devices in the storage system 125 of the image capturing device 50. As shown in FIG. 3, the electronic map 18 includes the image capturing devices of 50, 51, 52, 53, 54, 55, 56, 57, 58, 59, and 60.

In block S13, the administrator sets the path table 30 according to the installed position of each of the image capturing devices on the electronic map 18. In addition, the data setting module 121 stores the path table 30 in the storage system 125 of the image capturing device 50.

In block S14, the administrator sets the tracking mechanism and the tracking parameters on the setting interface of the image capturing device 50. The data setting module 121 stores the tracking mechanism and the tracking parameters in the storage system 125 of the image capturing device 50.

In block S15, the data setting module 121 sends the electronic map 18, the path table 30, the tracking mechanism, and the tracking parameters to the other image capturing devices in the monitored area through the network 14 according to the IP address of each of the other image capturing devices. In some embodiments, the image capturing devices 50 sends a data synchronization command to the other image capturing devices (e.g., the image capturing devices 51-60) if the time interval elapses. If the image capturing device 50 does not receive an acknowledge command corresponding to the data synchronization command from one or more of the other image capturing devices (e.g., the image capturing device 51), the data setting module 121 determines that the image capturing device 51 malfunctions. In other embodiments, the data setting module 121 may send a warning message to the administrator upon the condition that one of the image capturing devices malfunctions.

In some embodiments, the administrator may add a new image capturing device to the path table 30, delete a current image capturing device (e.g., the image capturing device 50)

from the path table 30, or update the current image capturing device in the path table 30, to obtain a new path table. The image capturing device 50 may send the new path table 30 to the other image capturing devices in the monitored area through the network 14.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An image capturing device, comprising:
   a storage system operable to store a path table, the path table storing an identifier (ID) of each of image capturing devices in a monitored area, and identifiers of adjacent image capturing devices of each of the image capturing devices;
   an image obtaining module operable to obtain an image of a monitored area;
   an object detection module operable to detect a specific object in the obtained image;
   a dynamic tracking module operable to determine adjacent image capturing devices in the monitored area according to the path table upon the condition that the specific object is detected, and to adjust a detection sensitivity of each of the adjacent image capturing devices according to a sensitivity mode of the image capturing device; and
   at least one processor to execute the image obtaining module, the object detection module, and the dynamic tracking module.

2. The image capturing device according to claim 1, wherein the sensitivity mode of each of the adjacent image capturing devices is adjusted from a low sensitivity mode to a high sensitivity mode.

3. The image capturing device according to claim 1, wherein the data setting module is operable to set a tracking mechanism for detecting the specific object.

4. The image capturing device according to claim 1, wherein the data setting module is operable to set tracking parameters, the tracking parameters comprising a time interval to perform data synchronization between the image capturing devices, and contact information of an administrator.

5. The image capturing device according to claim 1, wherein the dynamic tracking module is further operable to adjust a monitoring direction of each of the adjacent image capturing devices.

6. The image capturing device according to claim 1, wherein the dynamic tracking module is further operable to record a movement path of the specific object, and store the movement path of the specific object in the storage system.

7. A method for dynamically tracking a specific object in a monitored area, comprising:
   setting a path table, the path table storing an identifier (ID) of each of image capturing devices in the monitored area, and identifiers of adjacent image capturing devices of each of the image capturing devices;
   obtaining an image of the monitored area by one of a plurality of image capturing devices in the monitored area;
   detecting the specific object in the obtained image;
   determining adjacent image capturing devices in the monitored area according to the path table upon the condition that the specific object is detected, and adjusting a detection sensitivity of each of the adjacent image capturing devices according to a sensitivity mode of the one of the plurality of image capturing devices.

8. The method according to claim 7, wherein the sensitivity mode of each of the adjacent image capturing devices is adjusted from a low sensitivity mode to a high sensitivity mode.

9. The method according to claim 7, further comprising a step of setting a tracking mechanism for detecting the specific object.

10. The method according to claim 7, further comprising a step of setting tracking parameters, the tracking parameters comprising a time interval to perform data synchronization between the image capturing devices, and contact information of an administrator.

11. The method according to claim 7, wherein the step of setting the path table comprises:
    uploading an electronic map of the monitored area through a setting interface of one of the image capturing devices;
    marking an installed position and an Internet protocol (IP) address of each of the image capturing devices on the electronic map; and
    setting the path table according to the installed position of each of the image capturing devices.

12. The method according to claim 7, further comprising:
    adjusting a monitoring direction of each of the adjacent image capturing devices.

13. The method according to claim 7, further comprising:
    recording a movement path of the specific object; and
    storing the movement path of the specific object in the storage system.

14. A non-transitory storage medium having stored thereon instructions that, when executed by a processor of an image capturing device, causes the processor to perform a method for dynamically tracking a specific object in a monitored area, the method comprising:
    setting a path table, the path table storing an identifier (ID) of each of image capturing devices in the monitored area, and identifiers of adjacent image capturing devices of each of the image capturing devices;
    obtaining an image of the monitored area by one of a plurality of image capturing devices in the monitored area;
    detecting the specific object in the obtained image;
    determining adjacent image capturing devices in the monitored area according to the path table upon the condition that the specific object is detected, and adjusting a detection sensitivity of each of the adjacent image capturing devices according to a sensitivity mode of the one of the plurality of image capturing devices.

15. The non-transitory storage medium according to claim 14, wherein the sensitivity mode of each of the adjacent image capturing devices is adjusted from a low sensitivity mode to a high sensitivity mode.

16. The non-transitory storage medium according to claim 14, further comprising a step of setting a tracking mechanism for detecting the specific object.

17. The non-transitory storage medium according to claim 14, further comprising a step of setting tracking parameters, the tracking parameters comprising a time interval to perform data synchronization between the image capturing devices, and contact information of an administrator.

* * * * *